United States Patent
Huke et al.

(10) Patent No.: US 12,142,109 B2
(45) Date of Patent: Nov. 12, 2024

(54) QUANTUM SPORTS BETTING ALGORITHMS ENGINE

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 484 days.

(21) Appl. No.: 17/396,916

(22) Filed: Aug. 9, 2021

(65) Prior Publication Data

US 2022/0358808 A1 Nov. 10, 2022

Related U.S. Application Data (60) Provisional application No. 63/183,757, filed on May 4, 2021.

(51) Int. Cl.
*G07F 17/32* (2006.01)
*G06F 17/18* (2006.01)
(Continued)

(52) U.S. Cl.
CPC ............ *G07F 17/323* (2013.01); *G06F 17/18* (2013.01); *G06N 10/00* (2019.01); *G06N 20/00* (2019.01); *G07F 17/3288* (2013.01)

(58) Field of Classification Search
CPC .... G07F 17/323; G07F 17/3288; G06F 17/18; G06N 10/00; G06N 10/60
See application file for complete search history.

(56) References Cited

U.S. PATENT DOCUMENTS 11,127,250 B1 * 9/2021 Huke ............... G06Q 50/34
2009/0149233 A1 6/2009 Strause et al.
(Continued)

FOREIGN PATENT DOCUMENTS

WO 2016110797 A1 7/2016
WO 2019244151 A1 12/2019

OTHER PUBLICATIONS

Notification of Transmittal of the International Search Report and the Written Opinion issued on Aug. 23, 2022 in corresponding International Application No. PCT/US2022/027240; 8 pages.
(Continued)

*Primary Examiner* — James S. McClellan
*Assistant Examiner* — Ross A Williams
(74) *Attorney, Agent, or Firm* — Maier & Maier, PLLC (57) ABSTRACT

An engine that both calculates "basic odds" (calculated by using historical database mining) and at least one more odds making formula to calculate odds on at least one outcome of a single play in a live event, crossing at least two different odds making formulas to create crossed odds. The embodiments can utilize AI to correlate the crossed odds with the final odds on similar historical plays in which odds were calculated and use machine learning after the play's outcome is known to correlate odds generated by each odds making formula with most profitable odds calculated on previous similar plays. This system may use a hybrid of a basic computer system with AI capability computers and connection to quantum capability computers to assist with calculating odds where the basic computer can determine when and how much to invoke the AI capability, the Quantum capability, and the combined AI capability.

9 Claims, 7 Drawing Sheets

(51) Int. Cl.
*G06N 10/00* (2022.01)
*G06N 20/00* (2019.01)

(56) References Cited

U.S. PATENT DOCUMENTS

| | | |
|---|---|---|
| 2019/0251794 A1 | 8/2019 | Simon et al. |
| 2019/0392684 A1 | 12/2019 | McDonald et al. |
| 2020/0111325 A1 | 4/2020 | Lockton et al. |
| 2020/0312089 A1 | 10/2020 | Joao |
| 2022/0084368 A1* | 3/2022 | Merati .................. G06Q 50/34 |

OTHER PUBLICATIONS

Pretorius et al., "Human Decision Making and Artificial Intelligence—A Comparison in the Domain of Sports Prediction", SAICSIT '16: Proceedings of the Annual Conference of the South African Institute of Computer Scientists and Information Technologists Sep. 2016 Article, No. 32, pp. 1-10, Sep. 26-28, 2016, Johannesburg, South Africa.

* cited by examiner

Fig.1 Content - Quantum Sports Betting Algorithms Engine

| Formulas - Play ID NEGB35 | Formula Odds | Correlation Coefficient | Primary Odds Calculation | Primary Value Betting | Primary Betting Arbitrage | Betting Bank | Unit Stakes | Kelly's Criterion | Monte Carlo Simulation |
|---|---|---|---|---|---|---|---|---|---|
| Monte Carlo Simulation | +400 | 0.65 | +350/0.69 | +375/0.72 | +300/0.66 | +325/0.54 | +363/0.72 | +375/0.60 | |
| Kelly's Criterion | +350 | 0.55 | +325/0.63 | +350/0.55 | +275/0.61 | +300/0.48 | +337/0.71 | | |
| Unit Stakes | +325 | 0.82 | +313/0.79 | +337/0.70 | +266/0.58 | +280/0.62 | | | |
| Betting Bank | +250 | 0.42 | +275/0.58 | +300/0.50 | +225/0.55 | | | | |
| Primary Betting Arbitrage | +200 | 0.67 | +250/0.72 | +275/0.61 | | | | | |
| Primary Value Betting | +350 | 0.55 | +325/0.60 | | | | | | |
| Primary Odds Calculation | +300 | 0.75 | | | | | | | |
| Final Odds | +313 | | | | | | | | |

Fig. 2 cross-database

Fig.3 base module

Fig.4 betting algorithms module

Fig.5 cross-module

Fig.6 AI comparison module

Fig.7 final odds module

Fig.8 machine learning

QUANTUM SPORTS BETTING ALGORITHMS ENGINE

CROSS-REFERENCE TO RELATED APPLICATIONS

The present patent application claims benefit and priority to U.S. Provisional Patent Application No. 63/183,757 entitled "QUANTUM SPORTS BETTING ALGORITHMS ENGINE" filed on May 4, 2021, which is hereby incorporated by reference into the present disclosure.

FIELD

The present disclosures are generally related to sports betting odds calculations. The odds are calculated on a classical computer or supercomputer, or quantum computed based upon various scenarios of plays and outcomes of plays in "play-by-play" sports betting.

BACKGROUND

There are numerous ways to calculate odds on a single play's potential outcomes in a sporting event. Determining the proper odds-making formula to use in each context is an important choice for a sportsbook. Formulas could be, for example, formulas that are in and of themselves computer program modules designed to find profitable sports betting opportunities. They use vast amounts of data from past sporting matches to identify patterns, then calculate the probability of specific sporting outcomes. In most cases, primary betting algorithms calculate the likelihood of various outcomes and compare those probabilities to bookmakers' odds to identify bets that are worth placing.

Betting lines aren't designed to reflect the real and accurate probability of either outcome. Users attempt to gain an edge over sportsbooks by making a wager when they think there is a discrepancy between an event's actual probability and the implied probability determined from a betting line. Current odds making is just as much a risk management proposition as it is a method of predicting sporting events.

As more investment is made in play-to-play sports betting, there is a bigger need to ensure that calculated odds, used in the sports betting platforms, are optimized for both enticing bettors and guaranteeing the house wins. The best algorithms need to be available to ensure the bets are enticing thereby ensuring profits for the game platform owners.

Currently, odds betting programs have relied on trade secret algorithms based upon evaluating historical data to develop the best odds calculations given to players to gamble. The best algorithms need to be available to ensure the bets are enticing thereby ensuring profits for the game platform owners. Historical data may be used in each calculation to improve the precision of the odds calculations.

Odds betting on play-by-play possibilities is new and allows for specific bets to be made, for instance, betting on the next pitch at a baseball game or the next pass or run of a football game. Given that there are so many play-by-play possibilities, all with large historical data, it becomes harder to calculate all the possibilities to create the best odds. What is needed is to deal with an increasing amount of data to calculate the best odds.

Artificial Intelligence ("AI") is now being pursued to evaluate the big data associated with the large data to be analyzed on play-by-play betting to calculate the best odds. However, to be accurate, AI needs to have sufficient data to perform machine learning and train a model to estimate future odds. Unlike using AI to exercise its models against big data for research, play-by-play sports betting must be done in real-time and typically within seconds. What is required to create odds in real time on big play-by-play data requires enhanced computing capability beyond machine language models.

Artificial Intelligence is now being pursued to evaluate the big data associated with the large data to be analyzed on play-by-play betting to calculate the best odds. However, to be accurate, AI needs to have sufficient data to perform correlations and train a model to estimate future odds. Unlike using AI to exercise its models against big data for research, play-by-play sports betting must be done in real-time and typically within seconds. What is required to create odds in real time on big play-by-play data requires enhanced computing capability beyond correlations models.

SUMMARY

Methods, systems, and apparatuses for a quantum sports betting algorithm may be shown and described. In one embodiment, a system for calculating odds on at least one outcome of at least one play in a live sporting event can include at least one processor; and at least one memory having instructions stored thereon which, when executed by the at least one processor, cause the processor to: receive live event data from a live sporting event; determine a probability of available odds in the live event using a probability engine; calculate odds on live event data using at least two odds-making formulas; combine at least two results from the odds-making formulas and determine at least one correlation between the results and historical plays using artificial intelligence; analyze historical play data from a historical plays database for the number of available choices and data and determine to use at least a classical computer within the wagering network, a supercomputer, or a quantum computer to calculate odds on at least one live event; determine a likelihood of the calculated odds providing value to the wagering network through machine learning; and offer the calculated odds on the wagering network.

In another embodiment, a system of calculating odds on at least one outcome of at least one play in a live sporting event may include a base module which prompts an odds calculation module, a betting algorithms module, a cross module, an AI comparison module, a final odds module, a wagering module, and a machine learning module; the betting algorithms module is configured to identify and utilize at least two odds-making formulas and to write the result of those formulas to a cross-database; the cross module configured to retrieve at least one set of calculated odds from the cross database and calculate a cross of the odds; the AI comparison module is configured to retrieve historical play data from a historical plays database, retrieve calculated odds from the cross-database, calculate a correlation between the cross of formula outputs and a set of final odds, and write the results of the correlation to the cross-database; the final odds module is configured to retrieve at least one correlation from the cross-database, identify an odds-making formula with the highest correlation, identify the cross with the identified correlation, and send a set of odds in the identified cross to the base module; the machine learning module is configured retrieve historical play data from the historical plays database, retrieve cross data from the cross-database, retrieve wagers on identified plays from a user database, calculate a set of odds with the highest value for the wagering network, correlating the odds-making formulas with the highest value odds, and write at least one correlation to the cross-database; the cross-database is configured to contain the output of the betting algorithms module, the cross-module, the AI comparison module, the final odds module, the machine learning module, and the odds-making formulas used by the betting algorithms module; and at least one of a classical computer configured to calculate odds, a supercomputer configured to calculate odds; and a quantum computer configured to calculate odds.

DETAILED DESCRIPTION

Embodiments of the present disclosure will be described more thoroughly from now on with reference to the accompanying drawings. Like numerals represent like elements throughout the several figures, and in which example embodiments are shown. However, embodiments of the claims may be embodied in many different forms and should not be construed as limited to the embodiments set forth herein. The examples set forth herein are non-limiting examples and are merely examples, among other possible examples.

Figure 1:
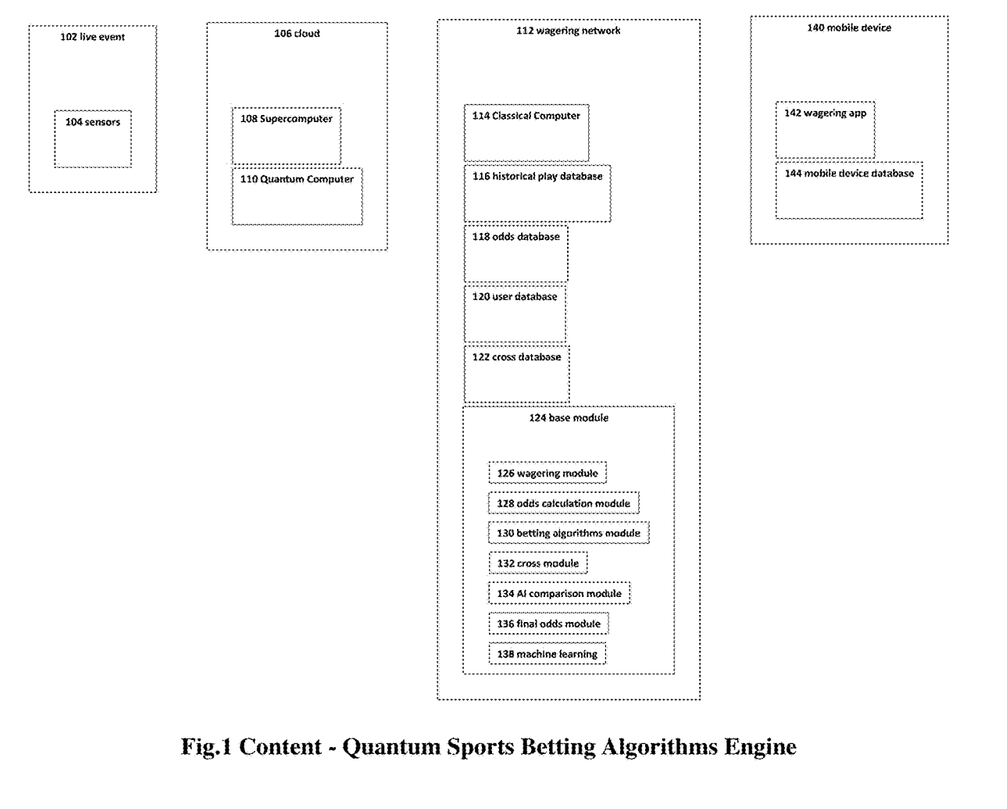
FIG. 1: Illustrates a quantum sports betting algorithms engine, according to an embodiment.

FIG. 1 is a system for a quantum sports betting algorithms engine. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 112, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a supercomputer 108, a computer with a high-performance level compared to a general-purpose computer. Supercomputer performance is commonly measured in floating-point operations per second (FLOPS) instead of million instructions per second (MIPS). In 2017, for instance, supercomputers can perform over 1017 FLOPS (a hundred quadrillion FLOPS, 100 peta-FLOPS, or 100 PFLOPS). Supercomputers play an essential role in the field of computational science. Supercomputers may be used for a wide range of computationally intensive tasks in various areas. These include quantum mechanics, weather forecasting, climate research, oil and gas exploration, molecular modeling (computing the structures and properties of chemical compounds, biological macromolecules, polymers, and crystals), and physical simulations (such as simulations of the early moments of the universe, airplane and spacecraft aerodynamics, the detonation of nuclear weapons, and nuclear fusion).

Further, embodiments may include a Quantum computer 110, which may use the quantum phenomena such as superposition and entanglement to perform computation. Computers that perform quantum computations are known as quantum computers. Quantum computers may solve certain computational problems, such as integer factorization (which underlies RSA encryption), substantially faster than classical computers. Examples of several quantum computers (or rather, quantum computing systems), may include the quantum circuit model, quantum Turing machine, adiabatic quantum computer, one-way quantum computer, and various quantum cellular automata. The most widely used model is the quantum circuit. Quantum circuits are based on the quantum bit, or "qubit," which is somewhat analogous to the bit in classical computation. Qubits can be in a 1 or 0 quantum state, or they can be in a superposition of the 1 and 0 states. However, when qubits are measured, the measurement results are always either a 0 or a 1; the probabilities of these two outcomes depend on the quantum state that the qubits were in immediately before the measurement. A quantum computer may also solve any computational problem that a classical computer can solve. Conversely, any problem that a quantum computer can solve can also be solved by a classical computer, at least in principle, given enough time.

Further, embodiments may include a wagering network 112, which may perform real-time analysis on the type of play and the result of a play or action. The wagering network 112 (or cloud 106) may also be synchronized with game situational data, such as the game's time, the score, location on the field, weather conditions, and the like, affecting the choice of play utilized. For example, in other exemplary embodiments, a wagering network 112 may not receive data gathered from sensors and may, instead, receive data from an alternative data feed, such as SportsRadar®. This data may be provided substantially immediately following the completion of any play, and the data from this feed may be compared with a variety of team data and league data based on a variety of elements, including down, possession, score, time, team, and so forth, as described in various exemplary embodiments herein. The wagering network can offer several software as a service managed services such as user interface service, risk management service, compliance, pricing and trading service, IT support of the technology platform, business applications, game configuration, state-based integration, fantasy sports connection, integration to allow the joining of social media, as well as marketing support services that can deliver engaging promotions to the user.

Further, embodiments may include a classical computer 114 machine that may automatically carry out sequences of arithmetic or logical operations via computer programming. Classical computers 114 can follow generalized sets of functions, called programs. These programs enable computers to perform a vast range of tasks. A "complete" classical computer including the hardware, the operating system (main software), and peripheral equipment required and used for "full" operation can be referred to as a computer system. This term may also be used for a group of connected computers and work together, particularly a computer network or computer cluster. Classical computers 114 may be used as control systems for a wide variety of industrial and consumer devices. This includes simple special-purpose devices like microwave ovens and remote controls, factory devices such as industrial robots and computer-aided design, and general-purpose devices like personal computers and mobile devices such as smartphones. The Internet is run on computers, and it connects hundreds of millions of other computers and their users. Conventionally, a classical computer 114 includes at least one processing element, typically a central processing unit (CPU) in the form of a microprocessor, along with some computer memory, typically semiconductor memory chips. The processing element carries out arithmetic and logical operations, and a sequencing and control unit can change the order of operations in response to stored information. Peripheral devices include input devices (keyboards, mice, joystick, etc.), output devices (monitor screens, printers, etc.), and input/output devices that perform both functions (e.g., the 2000s-era touchscreen). Peripheral devices allow information to be retrieved from an external source, and they enable the result of operations to be saved and retrieved.

Further, embodiments may include a historical play database 116 containing play data for the type of sport being played in the live event 102. For example, in American Football, for optimal odds calculation, the historical play data should include metadata about the historical plays, such as time, location, weather, previous plays, opponent, physiological data, etc.

Further, embodiments may utilize an odds database 118 that may contain the odds calculated by the odds calculation module 128 and the multipliers for distance and path deviation and may be used for reference by the wagering module 126 to take bets from the user through a user interface and calculate the payouts to the user.

Further, embodiments may utilize a user database 120, which may contain data relevant to all system users, which may include, a user ID, a device identifier, a paired device identifier, wagering history, and wallet information for each user.

Further, embodiments may include a cross-database 122, which may contain the output of the betting algorithms module 130, the output of the cross-module 132, the output of the AI comparison module 134, and the output of the final odds module 136. The machine learning module 138 and the mechanisms of the odds-making formulas may be used by the betting algorithms module 130 for all previous plays that have offered wagers on at least one outcome on the wagering network 112.

Further, embodiments may include a base module 124 that may control the order of operations of the other modules and databases on the wagering network 112 and enable the flow of information about the live event 102 from either the sensors 104, the cloud 106, or some combination of those. The base module 124 may also enable the interaction of the wagering app 142 on the mobile device 140.

Further, embodiments may include a wagering module 126 that may present available wagers from the wagering network 112 to users of the wagering app 142, collect their wagers, compare the wagers to the actual results, and utilize the odds to adjust the user's account balance in the user database 120. Further, the wagering module 126 may allow the user to place wagers on individual plays inside the live event 102 through the wagering app 142. Once a wager is placed, the live event 102 may be monitored for the end of the play, in this example, the referee's whistle in an American football game. The actual play result may be compared to the wager. The play result, wager, wager amount, and odds may then be used to calculate the adjustment to the user's wallet information in the user database 120. The wagering app 142 may be monitored for more wagers until the user logs off or the live event 102.

Further, embodiments may include an odds calculation module 128, which may utilize historical play data to calculate odds for in-play wagers. The information from the historical plays database 116 may include data related to the type of the play, the previous information related to players involved in the live event 102, and results of the previous live events 102. The odds for each live event 102, such as in a baseball game, a particular player hitting a home run, a single, or a strikeout, may be calculated based on the information received from the sensors 104 and the previous information related to the particular player. Further, the odds may be updated based on in-game events (for example, a player strikes a home run with the same pitcher, decreasing his odds of getting a strikeout from the same pitcher). The odds may be calculated or adjusted based on statistical information related to the live event 102 and the players' statistical information. For example, the odds may be determined based on the historical data such as prior performance information about a player (like batting average against a certain pitcher, earned run average, catch probability, hamstring strain), and physiological information of player(s), etc., and current, i.e., real-time information, such as current confidence level, etc. In one exemplary embodiment, the type of wagering may be depending on the type of game being played. In one exemplary embodiment, the odds calculation module 128 may determine the available wagers to the user. The odds calculation module 128 may also comprise a probability engine, which may assemble all the historical data and real-time data and produce the odds (stored in the odds database 118) for in-play wagers. Thus, the odds calculation module 128 may provide useful information on all the potential outcomes, as available wagers, which may facilitate the user with a better knowledge to make certain judgments about the potential performance of players in each live event 102 and place a calculated wager with a potential return on the wager. For example, in a baseball game, the odds calculation module 128 may calculate odds related to Aaron Judge of New York Yankees, playing 3rd innings against the Clayton Kershaw of LA dodgers, hitting a single is 4/1 (for example, in money line +200), hitting a double are 5/1, hitting a home run are 3/1, and a strikeout is 2/1. Further, a money line of +200 would mean that the user would profit from $200 if the user places a wager of $100 and the user stands correct.

Further, embodiments may include a betting algorithms module 130 that may calculate the odds on at least one possible outcome of a play inside the live event 102, using at least one additional odds-making formula than the one used by the odds calculation module 128.

Further, embodiments may include a cross-module 132 that may calculate at least one combination of the odds created by the different odds making formulas in the betting algorithms module 130.

Further, embodiments may include an AI comparison module 134 that may calculate the correlation between each cross of odds making formulas in the cross-database 122, as calculated by the cross-module 132, and the final odds on each of the identified similar plays. In this example, a trendline is plotted using the final odds on all identified similar plays. The odds calculated by crossing each odds making formula may then be compared to that trendline.

Further, embodiments may include a final odds module 136 that may identify the odds making formula with the highest correlation to the most profitable odds for similar plays and then may identify the cross of that odds making formula's odds with another odds making formula to offer the best possible odds through the wagering module 126.

Further, embodiments may include a machine learning 138 that may compare the actual results of plays in the live event 102 with the odds created by each odds-making formula and the crosses between those formulas to identify the most profitable odds the wagering network 112. The profitability of each of the odds-making formula odds may be compared to the most profitable odds calculated to identify the odds-making formula most highly correlated with the most profitable odds for similar plays.

Further, embodiments may include a mobile device 142 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple iPhone. Some devices allow gesture recognition inputs by combining some of the inputs and outputs. Some devices allow for facial recognition, which may be utilized as an input for different purposes, including authentication and other commands. Some devices provide voice recognition and inputs, including, e.g., Microsoft KINECT, SIRI for iPhone by Apple, Google Now, or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or a wall, and may also interact with other electronic devices. Some I/O devices, display devices, or groups of devices may be augmented reality devices. An I/O controller may control the I/O devices. The I/O controller may control one or more I/O devices, such as e.g., a keyboard and a pointing device, e.g., a mouse or optical pen. Furthermore, an I/O device may also contain storage and an installation medium for the computing device. In still other embodiments, the computing device may include USB connections (not shown) to receive handheld USB storage devices. In further embodiments, an I/O device may be a bridge between the system bus and an external communication bus, e.g., a USB bus, a SCSI bus, a FireWire bus, and an Ethernet, a Gigabit Ethernet bus, a Fiber Channel bus, or a Thunderbolt bus. In some embodiments, the mobile device 142 could be an optional component. It would be utilized in a situation in which a paired wearable device utilizes the mobile device 142 as additional memory or computing power or connection to the Internet.

Further, embodiments may include a wagering app 142 which may be a program that enables the user to place bets on individual plays in the live event 102 and may display the audio and video from the live event 102 as well as the available wagers on the mobile device 140. The wagering app 142 allows the user to interact with the wagering network 112 to place bets and provide payment/receive funds based on wager outcomes.

Further, embodiments may include a mobile device database 144 that may store user data, historical play data, primary odds, data, etc.

Figure 2:
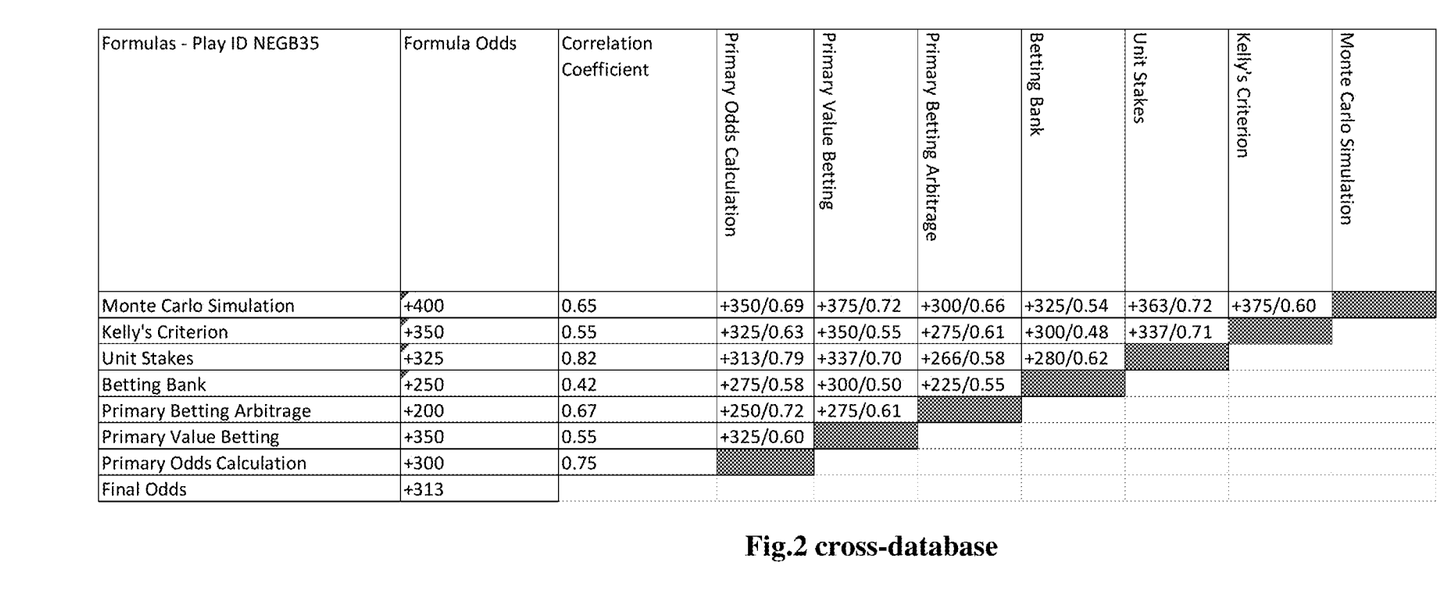
FIG. 2: Illustrates a cross-database, according to an embodiment.

FIG. 2 illustrates the cross-database 122. FIG. 2 illustrates the cross-database 122. The cross-database 122 may contain the output of the betting algorithms module 130, the cross-module 132, the AI comparison module, the final odds module 136, the machine learning module 138, and the odds-making formulas used by the betting algorithms module 130. The wagering network 112 may use several odds-making formulas. In this example, the wagering network 112 is using seven odds making formulas: the primary odds calculation output from the odds calculation module 128 based on the information available in the historical plays database 116, a primary value betting formula, a primary betting arbitrage formula, a betting bank formula, a unit stakes formula, Kelly's criterion formula, and a Monte Carlo simulation. Formulas could be, for example, formulas that are in and of themselves computer program modules designed to find profitable sports betting opportunities. They may use vast amounts of data from past sporting matches to identify patterns, which can then calculate the probability of certain sporting outcomes. In most cases, primary betting algorithms may calculate the probability of various outcomes and compare those probabilities to bookmakers' odds to identify bets that are worth placing. Primary betting algorithms can be divided into two types, depending on what they aim to achieve: value betting formulas and betting arbitrage formulas. Primary value betting formulas are used on any bet where the odds for a certain outcome seem favorable, based on the probability of that outcome occurring. There are plenty of value betting formulas that collect data from past sporting matches, estimate the probability of various outcomes. There are two parts to a value betting formulas. First, the formula needs to identify value bets, which relates to the idea of expected value. Second, the formula needs to suggest an appropriately sized bet, depending on how confident the bet could be made. Finding value bets is all about finding bets with an expected value greater than the bet's stake. The expected value of a bet is the profit or loss you can expect to make when placing a bet over and over again. With a value bet, the odds provided are high enough that a profit should be made based on the estimation of the outcome's probability. To calculate the expected value of a bet—and thus identify value bets—betting formulas rely on past data. By looking at how often a certain outcome occurred in past matches and analyzing the matches' trends, formulas may predict what will happen in an upcoming match. For example, if a football team scores an average of 2.1 goals every game, you can expect them to score more than two goals in an upcoming match. Primary betting arbitrage formulas may be used when an advantage is sought for changing odds for certain sporting outcomes. For example, a primary betting arbitrage formula may be used when one uses "betting exchanges," where betters can place a bet at favorable odds and then place a bet against their original bet (thereby guaranteeing a profit) once the odds have moved. This algorithm, the primary betting arbitrage, may be used when "patterns in odds" can be determined. Many professional betters like to have a set betting bank (size varies depending on wealth) from which they place all their bets. This allows them to easily keep track of profit and loss because all winnings and losses are coming from the same bank. It also allows them to stake set proportions of their bank on bets, which reflect their confidence in the selection's chances. Profit from the bank is periodically withdrawn when it reaches a certain amount for non-betting purposes. For example, a user may have a betting bank of 1000 dollars, from which the user may withdraw profit every time the bank reaches 1500 dollars or instead whatever profit has been made each three months. Formulas such as this may look at the user database 120 change the odds if the user has large quantities of money in the bank vs. small quantities money. Assigning unit stakes to bets may be useful as it may further discipline the bettor to be less likely to over bet in an event. Sometimes a maximum and minimum unit stake may be used, from one unit to twenty units. Depending on the punter's seriousness, a unit may be $1, $10, $100, or even more. These units are usually referred to as points. The more disciplined, the bettor, the smaller band of units they may use. This may make them less likely to over or under bet an outcome, as the confidence difference between units will be even more clearly defined in their minds. For example, a user may have stakes varying from 1 to 5 points. Each point may be worth 20 dollars. A minimum bet for a user may be 20 dollars, and a maximum bet may be 100 dollars. Formulas such as this may look at the user database 120 and adjust the odds if the user has larger unit stakes vs. less range of unit stakes. Kelly's Criterion is a formula that may be used to determine how much of a bank should be risked on a given bet. The formula may consider the bet's odds, the probability that it will win, and the probability that it will lose. This may ensure the whole bank is never lost on a bet and may steadily increase the bank. A disadvantage of this may be that there is no way of guaranteeing that money won't be lost. There may be a ⅓ chance of halving the bankroll before it is doubled. A Monte Carlo simulation (MCS) is also known as a system used by punters to forecast a wager's outcome. Working as a model of chance, the system may use a computer algorithm to run simulations to obtain a wager's probability. This may be done by converting uncertainties into probability by simulating a model numerous times to get a firm conclusion. An MCS may input the variables of a model into probability distributions and randomly select from them, essentially working similarly to the crowd's wisdom where the more one guesses, the closer to the result the system may be. For example, using the Monte Carlo method to determine whether the Patriots will win in a game versus the Giants. The system may add various parameters to the system, all of which could influence the game's result. For example, weather, head-to-head form, injuries, and starting quarterback could all impact. The system can then allow the function and system to run its course and produce a more accurate probability of the Patriots winning. The betting algorithms module 124 may run some or all of the available betting formulas for each possible outcome of an available wager to populate the formula odds column of the cross-database 122. In this example, the table may contain data related to the 35th play of an American football game between the New England Patriots and the Green Bay Packers being a run. In this example, the odds returned by the odds calculation module 128 based on the historical play database 116 may be +300 on the run. In this example, the MCS may have returned odds of +400 on the same play resulting in a run. Each available formula may be crossed against each other formula by the cross-module 132 to create blended odds. Those odds may be blended by taking the mid-point between the two odds. The odds may also be weighted towards one or the other or mixed in some other fashion. In this example, the cross between the primary odds calculation odd of +300 and the MCS odds of +400 may be +350. The AI comparison module 134 may populate each cross cell with a correlation coefficient relating each cross of odds to being correct in the context of this play. In this example, the cross between the primary betting arbitrage odds formula of +200 and the primary value betting formula of +350 may have a correlation coefficient of 0.61 with the final odds in similar historical plays. Similar plays may be defined differently based on characteristics of the play, game, players involved, weather, etc. In this example, similar plays are defined as having the same down and distance to go in the same quarter of a game. Finally, the machine learning module 138 may compare the final odds to the actual result and the odds produced by each odds making formula.

Figure 3:
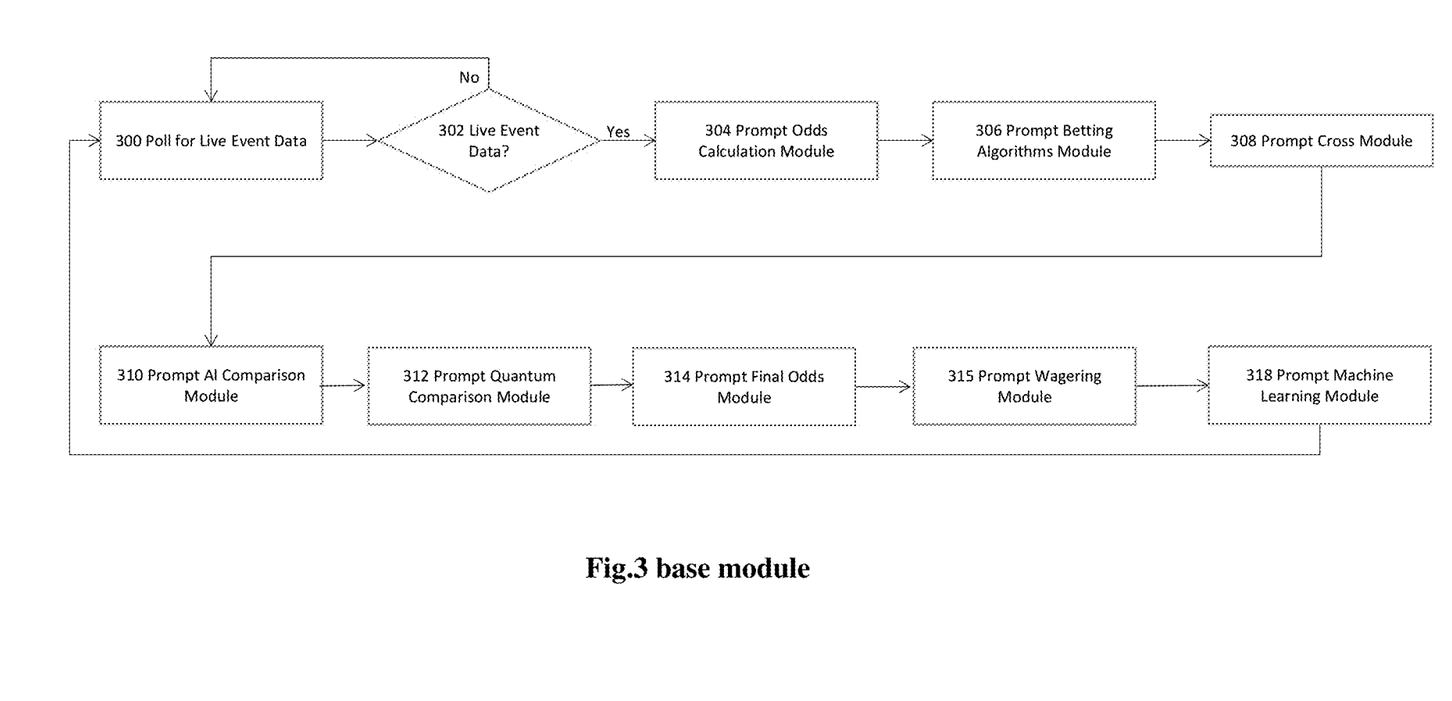
FIG. 3: Illustrates a base module, according to an embodiment.

FIG. 3 illustrates the base module 124. The process may begin with polling, at step 300, the cloud 106, or the sensors 104, for new data related to the live event 102. If there is not live event data, the module may return from step 302 to step 300 and continue to poll for new data. If there is data from the live event 102, the module may prompt, at step 304, the odds calculation module 128. As described earlier, the odds may be calculated or adjusted based on statistical information related to the live event 102 and the players' statistical information. For example, the odds may be determined based on the historical data such as prior performance information about a player (like batting average against a particular pitcher, earned run average, catch probability, hamstring strain), and physiological information of player(s), etc., and current, i.e., real-time information, such as current confidence level, etc. In one exemplary embodiment, the type of wagering may be depending on the kind of game being played. In one exemplary embodiment, the odds calculation module 128 may determine the available wagers to the user. The odds calculation module 128 may also comprise a probability engine, which may assemble all the historical data and real-time data and produce the odds (stored in the odds database 118) for in-play wagers. Thus, the odds calculation module 128 may provide useful information on all the potential outcomes, as available wagers, which may facilitate the user with a better knowledge to make individual judgments about the possible performance of players in each live event 102 and place a calculated wager with a potential return on the wager. For example, in a baseball game, the odds calculation module 128 may calculate odds related to Aaron Judge of New York Yankees, playing 3rd innings against the Clayton Kershaw of LA dodgers, hitting a single is 4/1 (for example, in money line +200), hitting a double are 5/1, hitting a home run are 3/1, and a strikeout is 2/1. Further, a money line of +200 may mean that the user would profit from $200 if the user places a wager of $100 and the user stands correct. The base module 124 may prompt, at step 306, the betting algorithms module 130, which may calculate odds on the next play in the live event 102 using at least two different odds making formulas, such as Primary Odds Calculation, Primary Value Betting, Primary Betting Arbitrage, Betting Bank Unit Stakes or Kelly's Criterion or Monte Carlo Simulation. The base module 124 may prompt, at step 308, the cross-module 132 to blend the results of each of the odds making formulas used by the odds calculation module 128. The base module 124 may prompt, at step 310, the AI comparison module 134 to calculate the correlation between each cross odds making formulas and the final odds in a similar play. Once the basic odds are calculated and the AI comparisons have been completed between all odds, the odds could be calculated. However, at this step, the historical plays database 116 may be evaluated to see how much data and choices for a given play there are and to see if a quantum model could best serve the odds calculations. For instance, classical computers that work through probabilities can determine probabilities by analyzing the number of possibilities. For example, if there are three possibilities, then 2 to the power of 3 or 8 unique combinations. If each possibility is a zero or one, then 2 to the 3rd power has eight unique numbers. So, for instance, in a play-by-playing bet, for a batter up at baseball, odds could be calculated based on the next play being (1) a swing or not, (2) a ball if a swing, or (3) a hit if a swing. The choices are related to each other. That is, a swing could yield a ball or hit but is limited to that. So, the real decisions are (1) not swing, (2) swing and ball, and (3) swing and hit. In the first embodiment, there may only be three possibilities and three unique outcomes. In other possibilities, there could be several possibilities for the outcome. For instance, a strike could be any sub-event for not swinging (inside corner, outside corner, down the middle or for a swinging sub-event (swing check, complete swing, bunt-miss), etc. As the number of possibilities grows and sub-events within the possibility grow, the total number of possibilities increases. This may be further enhanced (made worse) if the probabilities and sub-events are concatenated. For example, a simple calculation shown in table 1 may calculate the odds for an entire game.

TABLE 1

Calculation of a Tolal Odds Per Game

| # Plays Per Game | 100 | 100 | 100 | 100 | 50 |
|---|---|---|---|---|---|
| Outcomes Per Play | 20 | 10 | 10 | 5 | 5 |
| Outcomes Per Game | 1.2677E+130 | 1E+100 | 1E+100 | 7.8886E+69 | 8.88178E+34 |

TABLE 1-continued

| Calculation of a Total Odds Per Game | | | | | |
|---|---|---|---|---|---|
| #Odds Per Second | 1,000,000 | 1,000,000 | 100,000,000 | 100,000,000 | 1,000,000,000 |
| Seconds to Game Odds | 1.2677E+124 | 1E+94 | 1E+92 | 7.8886E+61 | 8.88178E+25 |
| Years to Game Odds | 4.0197E+116 | 3.17E+86 | 3.171E+84 | 2.5E+54 | 2.8164E+18 |

| Seconds | Minutes | Hours | Days | Years | Seconds Per Year |
|---|---|---|---|---|---|
| 1 | 60 | 60 | 24 | 365 | 31,536,000 |

CONCLUSION

50 Plays Per Game
5 Different Outcomes Per Play
1 Billion Odds Calculated Per Second (1 ns)
Will Take 10 to the 17th Years to Compute So, even for the fastest supercomputers, this is not a tenable result. At any point in time, by choosing any series of play-by-play odds to calculate, if, as in table 1, the time in seconds to calculate the game odds on a supercomputer should be less than the time between plays, so that the odds can be calculated and bet upon. This analysis is the foundational trigger to determine when a classical computer 114, supercomputer 108, and quantum computer 110 should be used. Once these seconds are calculated based upon the # of plays and outcomes per play, the calculation for odds should be redirected to the appropriate computer (classical 114, supercomputer 108 or quantum computer 110). It should be noted that the computations may be done on the cloud for the supercomputer or the quantum computer, and the classical computer 114 (servers) are likely located within the wagering network 112.

In the next embodiment, the computer may be chosen based upon speed and on the cost of using the computer. If it is possible to choose between any computer as the meet the speed requirements, the method may calculate the cost for expected use, and that cost will determine where to redirect the computation.

In the next embodiment, the computers may use offline (not in a real game) to determine the accuracy or range of the odds calculations. For a given scenario, such as, say, ten plays in a row, with 20 outcomes per play (as shown in Table 1), each computer for several scenarios may be run. The odds may be analyzed to see which computer has created the most profitable odds. This information may be used in a real game as if a scenario is offered for a series of play-by-play bets. The type of computer may be chosen based upon the most profitable and most enticing set of odds. For instance, if a quantum computer 110 is used in a scenario where the profit is higher for the house, the quantum computer 110 may be chosen over the supercomputer 108 or classical computer 114, even though the quantum computer would be more expensive to use. In this embodiment, the computer use cost may be calculated against the profit to be made at the best profit. If the net profit is larger after adding the computer costs, that computer may be chosen to run the real-time scenario.

In another embodiment, if the odds that are calculated appear to be below an expected profit limit while using the classical computer 114, running the odds calculation module 128, which may use the best-case cross found in running the cross-module 132, a more sophisticated computer (supercomputer 108 or quantum computer 110) may be used. Suppose the more sophisticated computer's net profit is larger after adding the computer costs, that more sophisticated computer may be chosen to run the real-time scenario.

In that case, a quantum computer 110 may be used (because of its ability to run many operations more quickly) to investigate several plays by play scenarios, such as numerous scenarios of say ten plays in a row, with 20 outcomes per play (as shown in Table 1), the quantum computer 110 operation may define the best play-by-play scenario based upon both excitements of the game player and the profit to the house. To keep a game player playing, it is useful to change the scenarios based on the game's events.

In another embodiment, if a scenario of several plays and outcomes and odds to be offered by a classical computer has a probability of profit lower than a set amount, a more sophisticated computer may be executed to see if the profit can be improved. In this way, the house's profit may be routinely scrutinized to determine the best computer type for the best profit. In another embodiment, based upon the sports game and the sports game's progress, the entire game of all possibilities may be virtually played on a quantum computer 110, to determine outcomes. If there is enough time to make final predictions of the game at best profitability, the sports game's ending could be bet on with the right odds during a play-by-play bet.

In another embodiment, a more sophisticated computer may be run in parallel (at random intervals) with the computer type being used, thereby double checking the best profitability. If it appears switching to the more sophisticated computer is more net profitable, then the more sophisticated computer may be used. The base module 124 may prompt, at step 312, the AI comparison module 134. The base module 124 then may prompt, at step 314, the final odds module 136 to select the odds from the cross-database 122 or the AI comparison module 134, to offer through the wagering module 126. The base module 124 then may prompt, at step 316, the wagering module 126 and may provide the final odds selected by the final odds module 136. The module then may prompt, at step 318, the machine learning module 138 to compare the final odds selected by the final odds module 136 with the actual results. The same comparison may be made between the odds calculated by each other odds making formula and the actual result in similar plays. The base module 124 then may return to step 300 polling for live event data.

Figure 4:
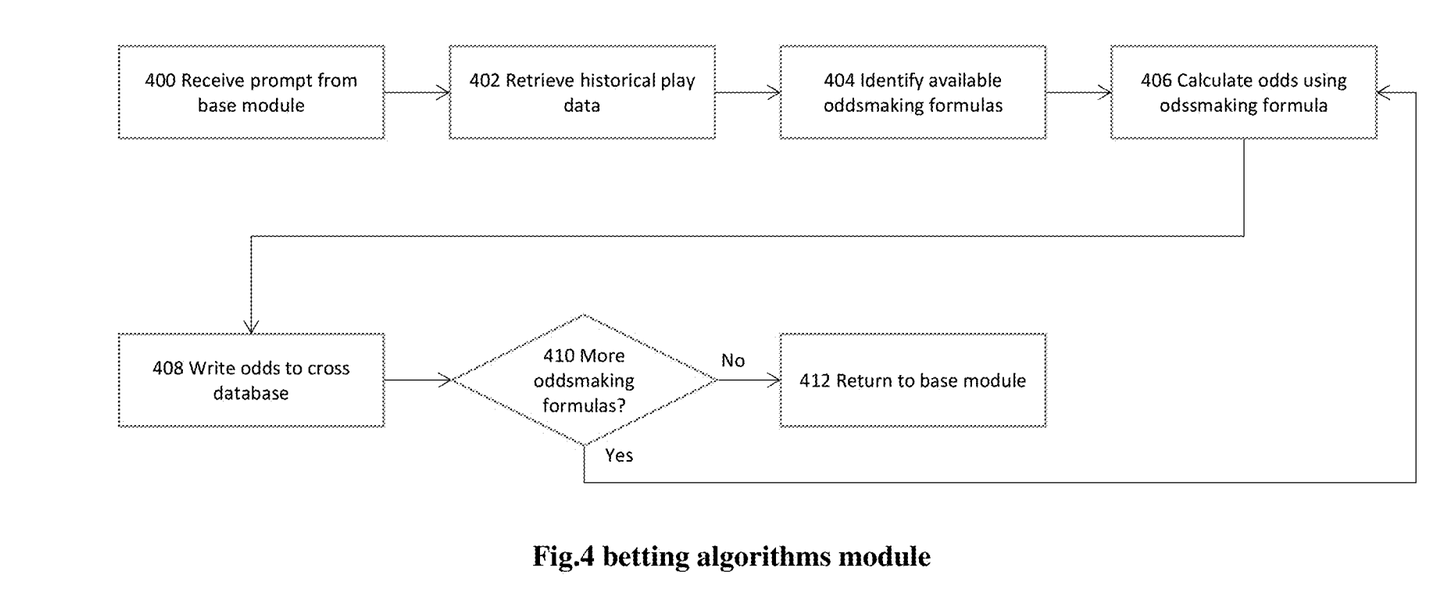
FIG. 4: Illustrates a betting algorithms module, according to an embodiment.

FIG. 4 illustrates the betting algorithms module 130. The process may begin with receiving, at step 400, a prompt from the base module 124 that there is a play in the live event 102 that wagers may be placed upon with at least one outcome. The betting algorithms module 130 may retrieve, at step 402, data from the historical play database 116 needed by the odds-making formulas. It should be evident that data beyond historical play data may be used by one or more of the odds making formulas. This data could include data from the user database 120 about the users and their wagering history, current account balances, etc. The data may also include 3rd party analytics or other information related to the live event 102, wagers, or users. The betting algorithms module 130 may identify, at step 404, the odds making formulas in the cross-database 122 that are available to calculate odds to offer on a play in the live event 102. In this example, all of the formulas in the cross-database 122 are used for each wagering option. Still, it should be evident that different odds making formulas could be used, or only a subset of the available formulas could be used. That subset could also change based on the context of the live event 102 or other reasons, such as the current handle or amount of exposure of the wagering network 112. The betting algorithms module 130 may calculate, at step 406, the odds on at least one outcome of a play in a live event 102 using the first available odds making formula. The betting algorithms module 130 may loop back to this step for each odds-making formula used to calculate the odds. The betting algorithms module 130 may write, at step 408, the calculated odds to the cross-database 122. The betting algorithms module 130 may determine, at step 410, if there are more odds-making formulas available in the cross-database 122 that have not yet been used to calculate the odds on at least one outcome of a play in the live event 102. If there are more odds making formulas available, the betting algorithms module 130 may return to step 406. If there are no more odds making formulas that are to be used at this time, the betting algorithms module 130 may return, at step 412, to the base module 124.

Figure 5:
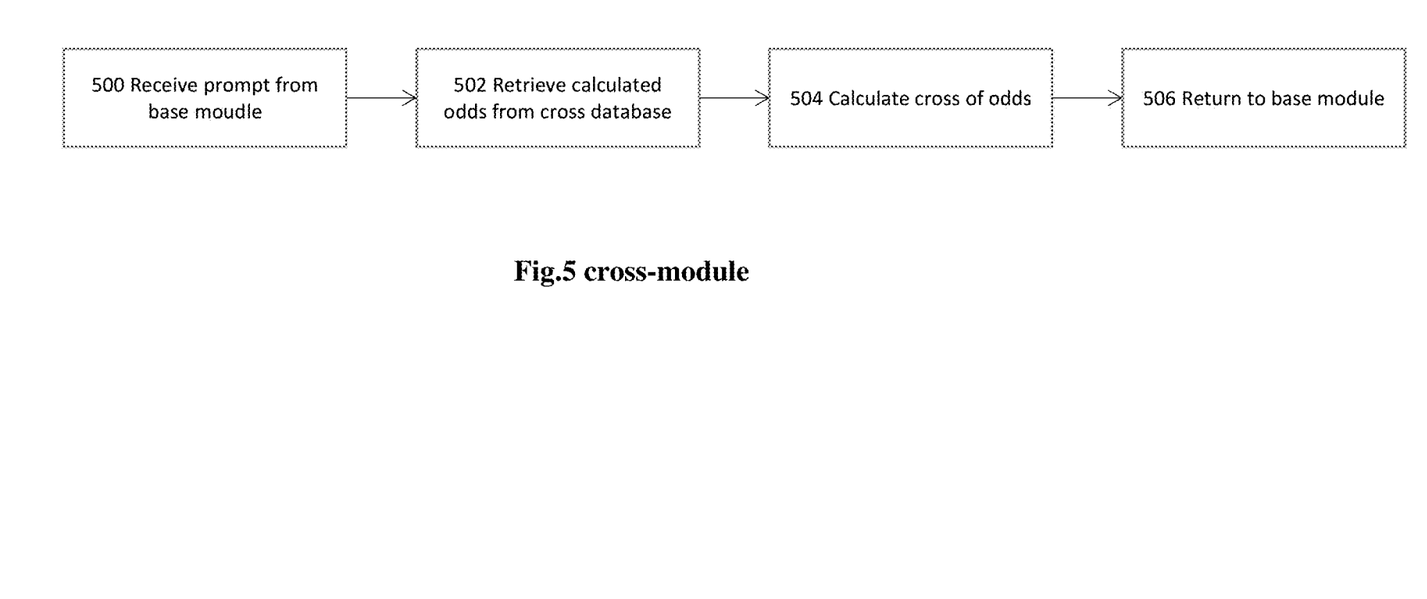
FIG. 5: Illustrates a cross-module, according to an embodiment.

FIG. 5 illustrates the cross-module 132. The process may begin with the cross-module 132 receiving, at step 500, a prompt from the base module 124 that odds have been calculated using at least two odds making formulas by the betting algorithms module 130. The cross-module 132 may then retrieve, at step 502, the odds calculated by the betting algorithms module 130 from the cross-database 122. The cross-module 132 may calculate, at step 504, the cross between each set of calculated odds. In this example, the odds may be calculated by the primary value betting formula +350 on the New England Patriots to run on the 35th play of their game against the Green Bay Packers. The MCS may have calculated odds of +400 on the same play. The cross between these two odds may be calculated as +375. While the mid-point between the two odds may be used as the cross in this example. It should be evident that there are different ways to calculate the cross between the two odds. One of the two could be weighted more heavily than the other. The lower odds or higher odds could be favored by default. The odds closer to the primary odds calculation could be favored, or different variations of crossing the odds. This may be done for each set of odds created against every other set of odds created. When all of the crosses between each set of calculated odds have been calculated and written to the cross-database 122, the module then may return, at step 506, to the base module 124.

Figure 6:
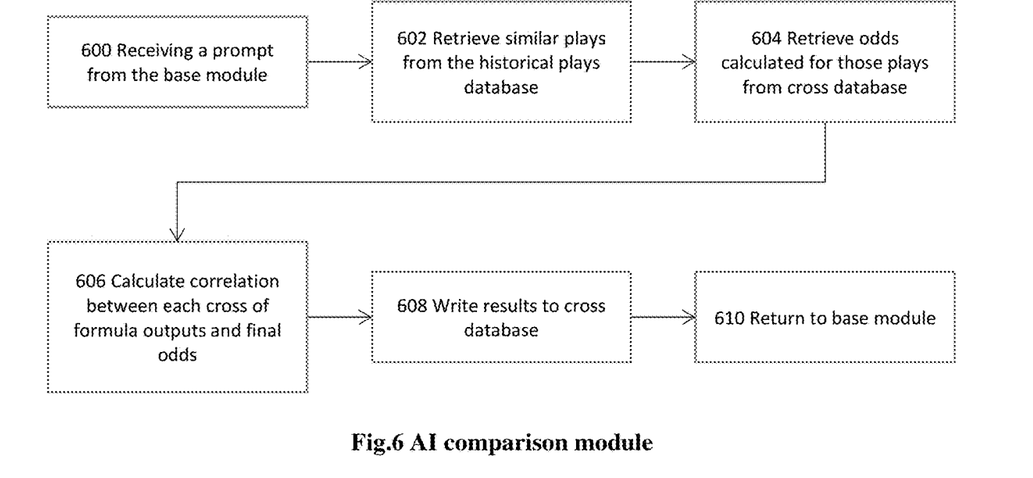
FIG. 6: Illustrates an AI comparison module, according to an embodiment.

FIG. 6 illustrates the AI comparison module 134. The process may begin with the AI comparison module 134 receiving, at step 600, a prompt from the base module 124 that there is a play in the live event 102 that wagers may be placed upon at least one outcome. The AI comparison module 134 may retrieve, at step 602, plays similar to the current play that odds are being calculated for, from the historical plays database 116. Similar plays can be defined in many different ways. In this example, a similar play is a play with the same down and distance to go in the same half. It should be obvious that a similar play can be defined in other ways, such as with an equal score, or other plays involving the same offense or the same defense, based on the stadium the game is played in, the current weather, the score of the game, or in several other ways. The AI comparison module 134 may retrieve, at step 604, the odds calculated by the available odds making formulas for the identified similar plays from the cross database 122. The odds created by crossing the odds created by each odds making formula may also be retrieved from the cross database 122. The AI comparison module 134 may calculate, at step 606, the correlation between each cross of odds making formulas in the cross-database 122, as calculated by the cross-module 132, and the final odds on each of the identified similar plays. In this example, a trendline is plotted using the final odds on all recognized similar plays. The odds calculated by crossing each odds making formula may then be compared to that trendline. If the odds for a particular cross of odds making formulas exactly matched the final odds on all previous plays, the correlation between that cross of odds-making formulas and the final odds may be an r-squared value of 1.0. The more significant the difference between the two data sets, the closer to zero the r-squared value becomes, indicating a lower correlation. This is done to identify the cross of odds making formulas that are most correlated with the final odds in the current context. In this example, the cross between the betting bank formula and Kelly's criterion formula has the lowest correlation to the final odds for similar plays, with an r-squared value of 0.48. The cross between the unit stakes odds and the primary odds calculation has the highest correlation to the final odds with an r-squared value of 0.79. While correlation may be used in this example, it should be obvious that other types of comparisons can be made, such as convolution, regression, etc. The AI comparison module 134 may write, at step 608, the calculated correlation coefficients to the cross-database 122. 608. The AI comparison module 134 may return, at step 610, to the base module 124.

Figure 7:
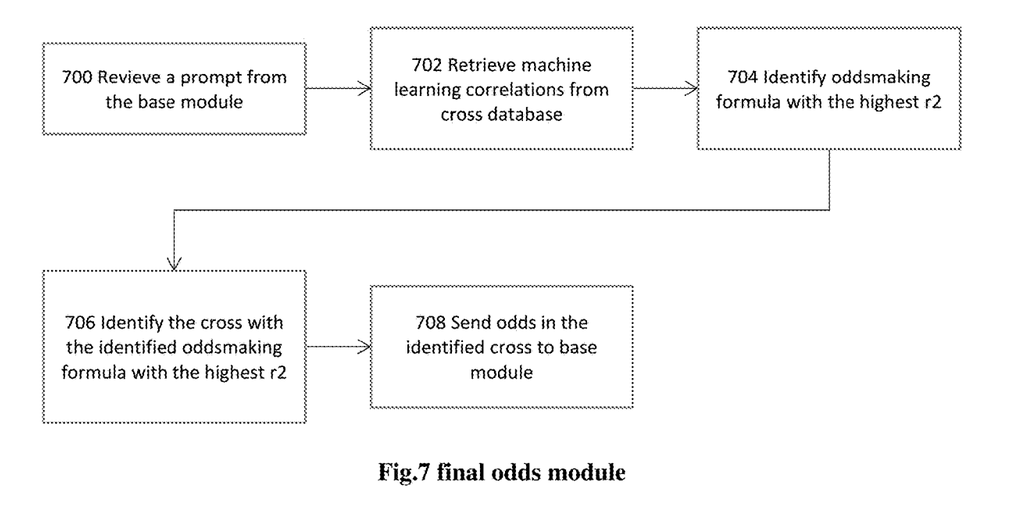
FIG. 7: Illustrates a final odds module, according to an embodiment.

FIG. 7 illustrates the final odds module 136. The process may begin with the final odds module 136 receiving, at step 700, a prompt from the base module 124 that there is a play in the live event 102 that wagers may be placed upon at least one outcome. The final odds module 136 may retrieve, at step 702, the output of the machine learning module 138 on the similar historical plays for each of the odds making formulas from the cross database 122. The final odds module 136 may identify, at step 704, the odds making formula with the highest r-squared value, indicating that it is the odds making formulas whose previous results are the most highly correlated with the actual results of the identified similar previous plays. In this example, the odds returned by the unit stakes formula were the most highly correlated to the actual results of plays identical to the current play, as represented by the r-squared value of 0.82. This may be calculated by the machine learning module 138, which may examine the final odds offered on the wagering network 112 and the odds of some or all of the available odds making formulas on all previous plays similar to the current play. The final odds module 136 may identify, at step 706, the cross with the identified odds making formula that has the highest correlation who's previous results are the most highly correlated to the final odds, as indicated by the r-squared value that is calculated by the AI comparison module 134. In this example, the unit stakes formula was identified at step 704, and the cross with the unit stakes formula that has the highest r-squared value is the primary odds calculations, with an r-squared of 0.79. This cross has odds of +350 on the run on the next play. The final odds module 136 may send, at step 708, the odds identified, to the base module 124.

Figure 8:
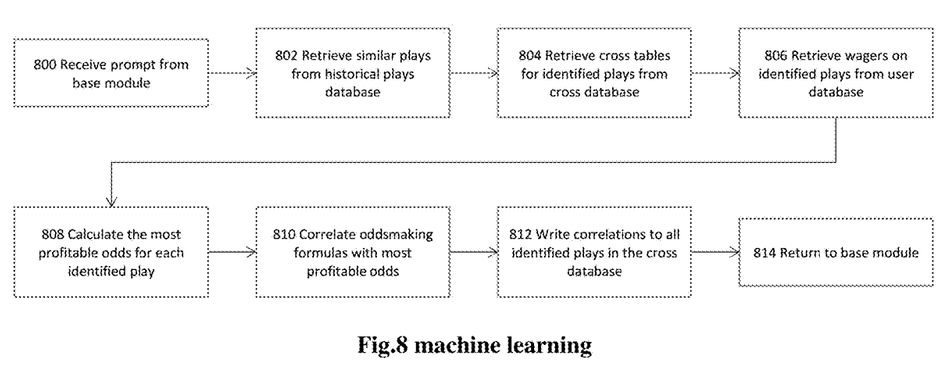
FIG. 8: Illustrates machine learning, according to an embodiment.

FIG. 8 illustrates the machine learning 138. The process may begin with the machine learning 138 receiving, at step 800, a prompt from the base module 124 that there is a play in the live event 102 that wagers have been placed upon at least one outcome. The machine learning 138 may retrieve, at step 802, the similar plays used by the AI comparison module 134 from the historical plays database 116. The machine learning 138 may retrieve, at step 804, the cross tables for the plays identified at step 802 from the cross database 122. The machine learning 138 may retrieve, at step 806, the wagers placed on the identified plays from the user database 120. The machine learning 138 may calculate, at step 808, the odds that would produce the most profit, or least loss, for the wagering network 112 based on the amount wagered on that play. This may be done by using the amount of money wagered on a given outcome, the actual outcome, and the odds produced by each of the odds making formulas in the betting algorithms module 130. It should be obvious that additional variables may be considered, such as the impact of the different odds on the action that is placed on a given outcome. The machine learning 138 may calculate, at step 810, the correlation between the odds created by each odds making formula and the most profitable odds for each of the identified historical plays that are similar to the play that was just wagered on through the wagering module 126. The correlation coefficient, represented as an r-squared value between zero and one, between each odds-making formula's profitability. In this example, the primary value betting formula was less correlated with the most profitable odds, with an r-squared value of 0.55, than the unit stakes formula, which had an r-squared value of 0.82 when correlated with the most profitable odds on all identified similar plays in the historical plays database 116. The machine learning 138 may write, at step 812, the correlation, expressed as an r-squared value in this example, to the table for each identified similar play in the cross database 122. It should be obvious that there are other ways in which machine learning or AI can be applied to the historical performance of odds in a given context. For example, instead of the odds that would create the most profit for the wagering network 112, the correlation could be to the odds that created the greatest handle or the largest number of wagers. The machine learning 138 may return, at step 814, to the base module 124.

The functions performed in the processes and methods may be implemented in differing order. Furthermore, the outlined steps and operations are only provided as examples. Some of the steps and operations may be optional, combined into fewer steps and operations, or expanded into additional steps and operations without detracting from the disclosed embodiments' essence.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for calculating odds on at least one outcome of at least one play in a live sporting event, comprising:
   at least one processor; and
   at least one memory having instructions stored thereon which, when executed by the at least one processor, cause the processor to:
   receive live event data from a live sporting event;
   determine a probability of available odds in the live event using a probability engine;
   calculate odds based at least in part on the received live event data using at least two odds-making formulas;
   combine at least two results from the odds-making formulas and determine at least one correlation between the results and historical plays using artificial intelligence;
   analyze historical play data from a historical plays database for a number of available choices and determine whether to use at least a classical computer within the wagering network, a supercomputer, or a quantum computer to calculate odds on at least one live event;
   determine a likelihood of the calculated odds providing value to the wagering network through machine learning; and
   offer the calculated odds on the wagering network.

2. The system for calculating odds on at least one outcome of at least one play in a live sporting event of claim 1, wherein the at least one memory having instructions stored thereon which, when executed by the at least one processor, further causes the processor to assemble the historical play data and the live event data to produce at least one set of odds for at least one in-play wager using the probability engine.

3. The system of calculating odds on at least one outcome of at least one play in a live sporting event of claim 1, wherein the odds-making formulas further comprise at least a Primary Odds Calculation formula, a Primary Value Betting formula, a Primary Betting Arbitrage formula, a Betting Bank Unit Stakes formula, a Kelly's Criterion formula, or a Monte Carlo Simulation formula.

4. The system of calculating odds on at least one outcome of at least one play in a live sporting event of claim 1, wherein the artificial intelligence utilizes a trendline to plot final odds on similar historical plays and compares the result of the odds-making formulas and the historical play data to determine an r-squared value which shows a calculated correlation between the result of the odds-making formulas the historical play data.

5. The system of calculating odds on at least one outcome of at least one play in a live sporting event of claim 4, wherein the artificial intelligence writes the calculated correlation to a cross-database.

6. The system of calculating odds on at least one outcome of at least one play in a live sporting event of claim 1, wherein the machine learning further comprises comparing the offered odds with at least one actual result from the live event.

7. A system of calculating odds on at least one outcome of at least one play in a live sporting event, comprising:
   a base module which prompts an odds calculation module, a betting algorithms module, a cross module, an AI comparison module, a final odds module, a wagering module, and a machine learning module;
   the betting algorithms module is configured to identify and utilize at least two odds-making formulas and to write the result of those formulas to a cross-database;

the cross module configured to retrieve at least one set of calculated odds from the cross database and calculate a cross of the odds;

the AI comparison module is configured to retrieve historical play data from a historical plays database, retrieve calculated odds from the cross-database, calculate a correlation between the cross of formula outputs and a set of final odds, and write the results of the correlation to the cross-database;

the final odds module is configured to retrieve at least one correlation from the cross-database, identify an odds-making formula with the highest correlation, identify the cross with the identified correlation, and send a set of odds in the identified cross to the base module;

the machine learning module is configured retrieve historical play data from the historical plays database, retrieve cross data from the cross-database, retrieve wagers on identified plays from a user database, calculate a set of odds with the highest value for the wagering network, correlating the odds-making formulas with the highest value odds, and write at least one correlation to the cross-database;

the cross-database is configured to contain the output of the betting algorithms module, the cross-module, the AI comparison module, the final odds module, the machine learning module, and the odds-making formulas used by the betting algorithms module; and at least one of a classical computer configured to calculate odds, a supercomputer configured to calculate odds; and a quantum computer configured to calculate odds.

8. The system of calculating odds on at least one outcome of at least one play in a live sporting event of claim 7, wherein the classical computer is housed within a wagering network.

9. The system of calculating odds on at least one outcome of at least one play in a live sporting event of claim 7, wherein the supercomputer and quantum computer are accessed through a cloud-based service.

* * * * *